Oct. 29, 1935.  W. H. HOWE  2,018,673
MEASURING MECHANISM
Filed Dec. 8, 1932   2 Sheets-Sheet 1
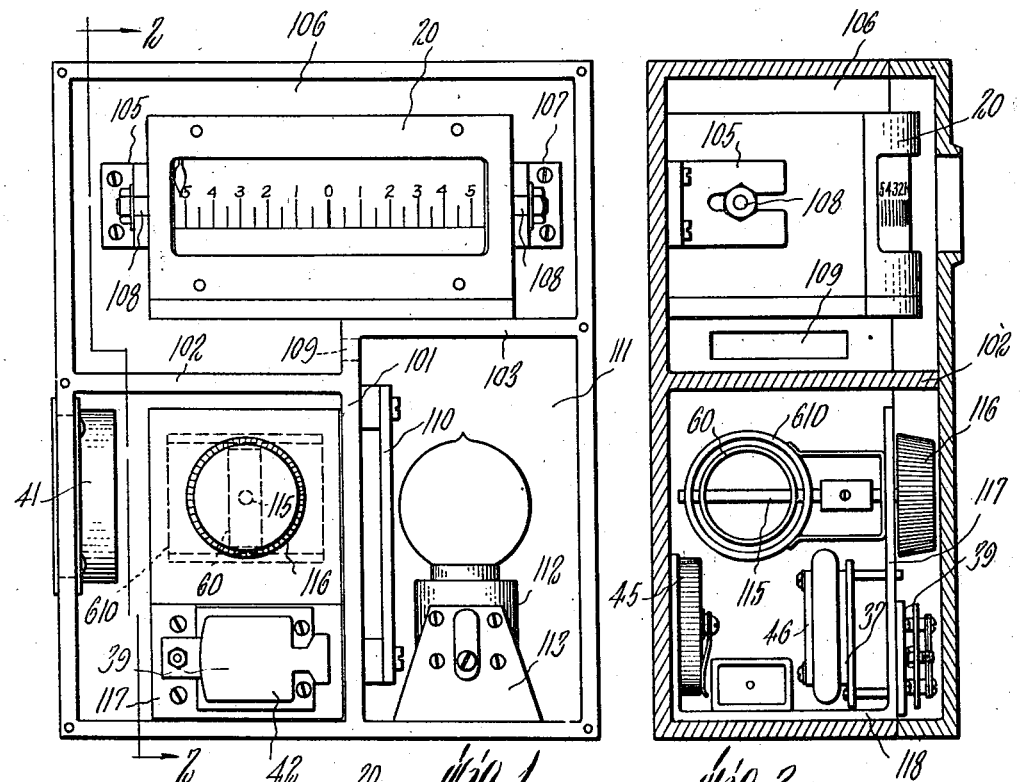
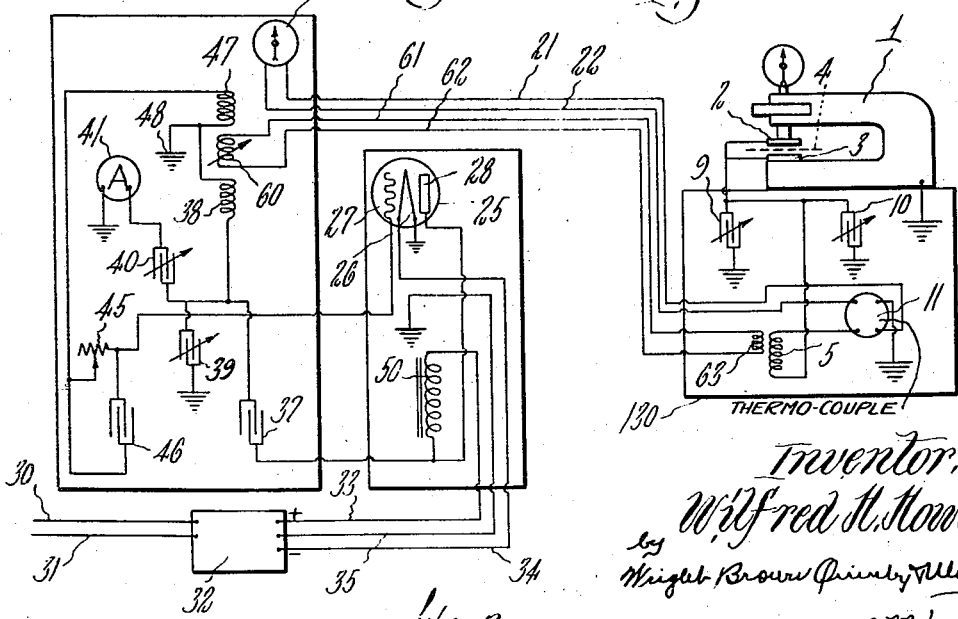

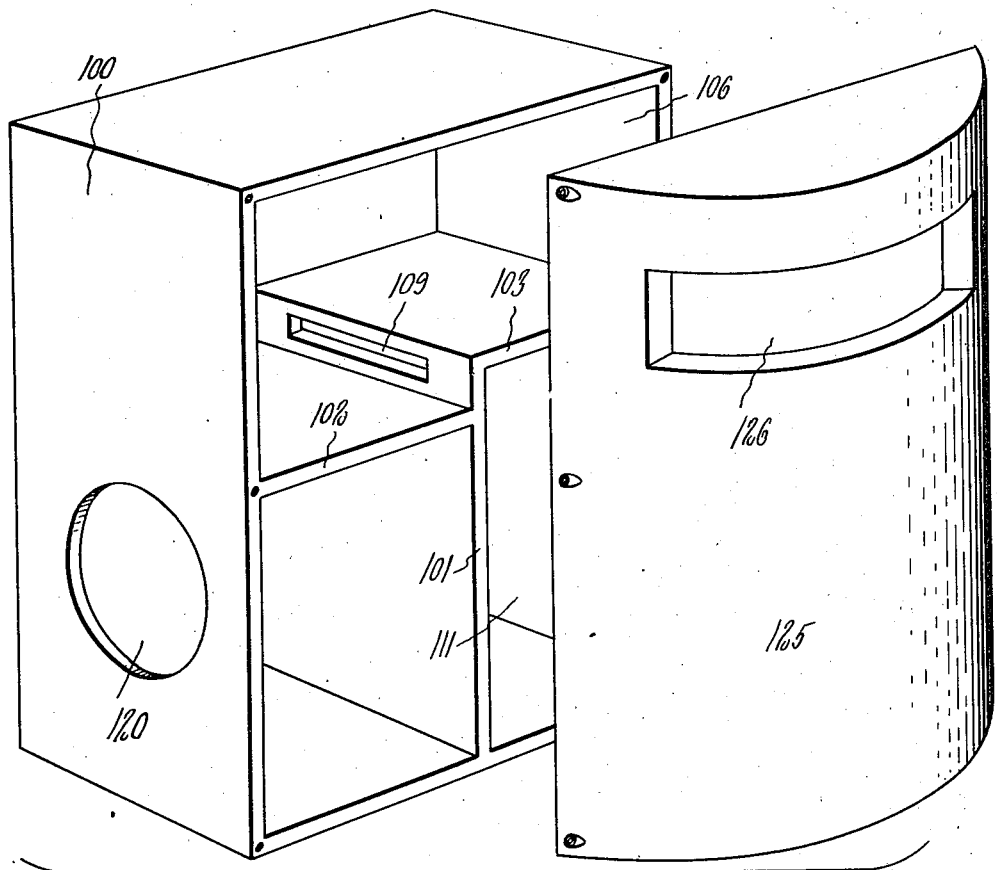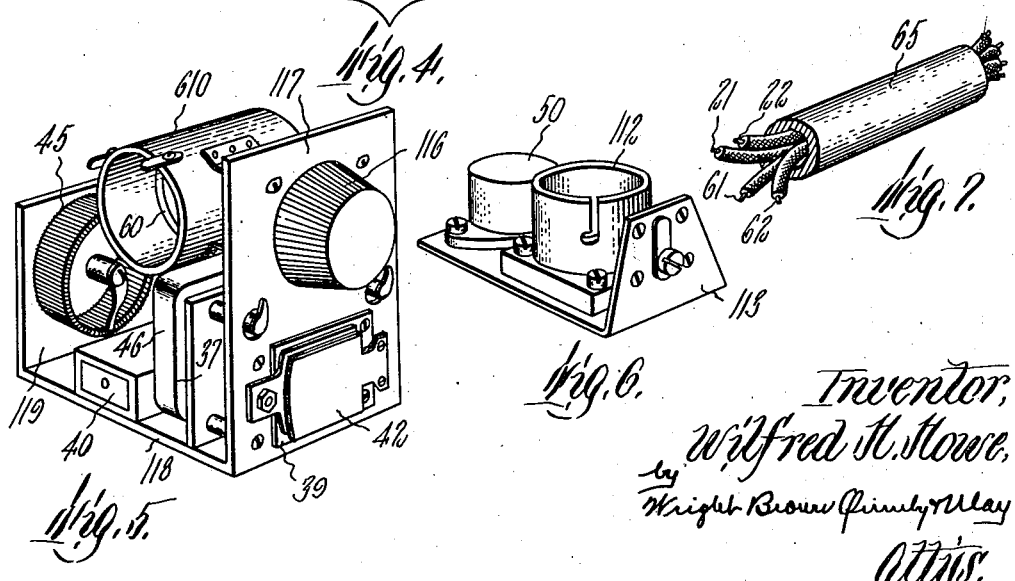

Patented Oct. 29, 1935

2,018,673

UNITED STATES PATENT OFFICE 2,018,673

MEASURING MECHANISM

Wilfred H. Howe, Winchester, Mass., assignor to Atlantic Precision Instrument Company, Malden, Mass., a corporation of Massachusetts Application December 8, 1932, Serial No. 646,321

18 Claims. (Cl. 175—183)

In the Allen Patents No. 1,708,073 and No. 1,708,074 granted April 9, 1929, are illustrated certain measuring mechanisms in which the variable to be measured is caused to determine in part the magnitude of an electrical characteristic of an electrical device e. g., the capacity of a condenser, employed as a tuning element of a high frequency oscillatory circuit in coupled relation to a second oscillatory circuit normally slightly detuned therefrom. In many installations of such a mechanism it is desirable that the indicator and other parts, such as the oscillator with its tube, be placed at some distance from the material being measured. When this is done a portion of the circuits must also be remote from the material being measured and must be coupled in some manner to the measuring tuning device. In the arrangements shown in these patents connections would be required including a high potential high frequency lead between the measuring condenser or other device responsive to the quantity to be measured and the portion of the mechanism remote from the material. Such a high frequency lead must be connected directly either to the oscillator coil or into the secondary circuit. If connected directly to the oscillator coil, the capacity between this lead and ground is directly in parallel with the tuning capacity of the oscillator, and even if such a lead is taken off well down the oscillator coil so that its voltage is relatively low, any change in this capacity from lead to ground will have a proportionate effect on the oscillator frequency and hence on the meter reading. If this lead is connected directly into the secondary circuit, any change of the capacity from lead to ground will have an effect on the natural period of this secondary circuit in exactly the same manner as a change of capacity of the measuring condenser, and will affect the reading of the meter proportionately. Furthermore, in the first case, the minimum voltage which can be used which provides for adequate power supply to the secondary circuit is sufficiently high that insulation becomes a serious problem, especially as any change of the resistance of the circuit has a material effect on the performance of the oscillator; while in the second case, the capacity of the shielded lead adds materially to the distributed capacity of the secondary circuit, thereby reducing the proportionate effectiveness of the change of capacity of the measuring condenser.

It is frequently necessary to make the measuring element movable but if this be done using any of the circuits heretofore mentioned, the oscillator must be rigidly attached to the measuring element and be moved with it since it would not be possible to maintain constant capacity between lead and ground where the parts connected thereby vary in relative position. Rigid attachment of the oscillator to the measuring condenser causes the measuring unit to be heavy, bulky and sufficient to mount. It frequently necessitates placing the oscillator in undesirable positions, whether through inaccessibility or because the measuring unit must frequently be located in positions of large temperature change, or be exposed to vibration, moisture or other undesirable conditions.

One of the objects of this invention, therefore, is to provide a mechanism in which the indicator and the major portion of the more delicate parts such as the vacuum tube may be positioned a very considerable and variable distance from the responsive device without danger of any detrimental capacity effects and without requiring shielding of the connecting leads, and from which the other undesirable characteristics inherent in the high potential high frequency lead in these prior circuits are eliminated.

This may be done by the use of an aperiodic coupling circuit so loosely coupled to both the exciting and the responsive circuit that the inherent characteristics of each are affected to a minimum extent by characteristics of the other and by characteristics of the coupling circuit. The minimizing of the effects of characteristics of the coupling circuit is most effectually realized when the coupling circuit is maintained at low potential relative to ground.

A further object is to so construct the mechanism that the parts may be readily assembled in small compact units which may be readily removed or replaced independently of each other when desired.

Further objects and advantageous details and combinations will appear from a more complete description of an embodiment of the invention shown in the accompanying drawings in which Figure 1 is a front elevation, the cover being removed, showing the assembly of parts remote from the material to be measured, wiring being omitted for the sake of clarity.

Figure 2 is a vertical section on line 2—2 of Figure 1.

Figure 3 is a wiring diagram of the entire mechanism.

Figure 4 is a perspective of the casing parts shown in Figures 1 and 2 in condition to receive the units to be encased therein.

Figure 5 is a perspective of the oscillator control unit.

Figure 6 is a perspective of the vacuum tube mounting together with a radio frequency choke associated therewith.

Figure 7 is a fragmentary perspective showing a type of cable lead which may be employed to advantage between the mechanism remote from the material to be tested and the mechanism adjacent to such material.

Referring first to Figure 3, at 1 is shown a tuning element responsive to characteristics of material being measured. While this might take any one of a great number of forms, it is shown for purposes of illustration as a caliper indicator for conductors of the general type shown in the application for patent of Albert Allen Serial No. 433,078 filed March 4, 1930, for Condenser mechanism. This device as shown comprises a pair of conducting plates 2 and 3 which together form one side of an electrical condenser, the other side of the condenser being formed by the material to be measured shown at 4 which passes between the plates 2 and 3 and which is grounded. Variations in the thickness of the material to be measured thus cause variations in the capacity of the condenser comprising the material to be measured and the plates 2 and 3. In place of this condenser it should be understood that condensers having a pair of spaced plates, each plate representing one side only of the condenser, the material to be measured passing therebetween and being of a dielectric nature, as shown in the Allen Patent No. 1,708,074 might be employed, or a condenser having a hygrometric dielectric the moisture content of which is responsive to the moisture content of material to be measured passing adjacent thereto as shown in the Allen Patent No. 1,708,073 might be employed if desired, and other mechanisms might of course be used if desired, provided only that the capacity of the condenser or other frequency tuning element may be made responsive to the characteristic of material which it is desired to measure. In place of a condenser, an inductance whose inductive value is dependent on the value of the characteristic to be measured may be substituted, as is shown for example in the Allen Patent No. 1,781,153, granted November 11, 1930, when used in connection with condensers of proper values. This responsive device, as shown, is arranged as a tuning element of an excited oscillatory circuit which may be provided with variable condensers 9 and 10 in parallel with the measuring device 1 and all in series with an inductance 5. In this circuit is also placed a thermo-couple 11. This circuit constitutes a closed oscillatory circuit whose natural frequency is dependent on the tuning value of the device 1 which in turn is responsive in any suitable manner, as hereinbefore described, to the characteristic of the material to be measured, it being understood that the variable condensers 9 and 10 are made variable for the purposes of adjustment but remain of fixed value during a measuring operation.

The thermo-couple 11 is employed for the purpose of generating a direct current proportional in amount to the alternating current excited in the oscillatory circuit containing the device 1, and for the purpose of measuring this direct current so as to indicate the value of the excited current, a direct current ammeter 20 is shown as connected to the thermo-couple by the direct current leads 21 and 22. This indicator 20 may be positioned at any suitable point and may be quite remote from the measuring device 1 and its closely affiliated devices, such as the condensers 9 and 10, the inductance 5, and the thermo-couple 11.

The exciting oscillatory circuit may also be as remote as desired from the device 1. As shown this exciting circuit comprises an oscillator which in approved form comprises a thermionic vacuum tube 25 having a filament 26, grid 27 and plate 28. This tube may be energized from a suitable source of potential such as the alternating current power lines 30 and 31 feeding a power unit indicated generally at 32 and from which may be derived current at suitable voltages for application to the filament and plate of the tube. At 33 is shown the plate voltage lead and at 34 the filament voltage lead with a ground connection indicated at 35. The plate circuit includes the condenser 37 and the tickler coil 38 and between this condenser and coil it is grounded through the condenser 39 and also through the condenser 40 in series with the radio frequency ammeter 41. The condenser 39 is shown as variable, one plate of this condenser being formed of thermostatic metal by which variations in frequency of the exciting circuit due to temperature changes of the oscillator are prevented. The outer plate 42 of this condenser 39, as shown best in Figure 5, is preferably made of thermostatic metal so arranged that as the temperature increases this plate bends outwardly from its cooperating plate, thus to decrease the capacity of this condenser in the proportion that the temperature raise varies other characteristics of the circuit which determines its frequency, this condenser being adjusted in practice until the desired compensation is produced.

The grid circuit contains the grid resistor 45, the grid condenser 46, and the inductance 47 and is grounded at 48 as is also the tickler coil 38. A radio frequency choke 50 may be interposed between the power unit 32 and the plate circuit to prevent feed-back of radio frequency current into the power lines.

The two oscillatory circuits are so adjusted, as disclosed in the Allen patents hereinbefore mentioned, as to be slightly detuned from each other so that variations in the tuning of the excited circuit containing the measuring device, due to changes in the amount of the characteristics to be measured, change the current response in the secondary or excited circuit.

The two circuits are coupled in accordance with this invention by a coupling circuit loosely coupled to both and of low voltage. This circuit comprises a coil 60 which may be arranged as a rotor within a tube 610 (see Figure 2) on which are wound the coils 38 and 47, so that by turning the coils 60 the closeness of coupling may be adjusted as desired to produce the desired current response in the instrument 20 for a desired value of the characteristic being measured. This coil 60 is connected by the low voltage high frequency leads 61 and 62 to a coil 63 in inductive relation to the coil 5 of the excited circuit. While the closeness of coupling of the coil 60 with the coils 38 and 47 may be adjusted, this coupling in any event is sufficiently loose, and the coupling between the coils 5 and 63 is also sufficiently loose, so that the coupling circuit behaves as an independent aperiodic or untuned unit and permits the exciting and the responsive or secondary circuits to function substantially independently in accordance with their own characteristics. Close coupling of the coupling circuit with the exciting circuit would cause the characteristics of the coupling circuit itself to act as parts of the frequency controlling characteristics of the exciting circuit and would thus cause this frequency to be sensitive to changes of capacity to ground of the coupling circuit even though the coupling circuit were of low voltage. Close coupling of the coupling circuit with the secondary or measuring circuit would cause variations in the characteristics of the coupling circuit such as its capacity to ground to change the tuning of the secondary circuit relative to the frequency of the exciting circuit and thus vary the current response in the measuring circuit in the same way that variations in capacity of the measuring condenser vary this current, so that this would also affect the accuracy of the measuring indication. The coupling circuit should therefore be coupled loosely at both ends, transmit at frequencies remote from its own natural period so that it may be truly aperiodic, and should be of low voltage in order that it may function to best advantage. By employing relatively few turns of wire in the coil 60 and positioning this coil adjacent to the grounded ends of the coils 47 and 38, the voltage of this coupling circuit may be kept at such a low value that the coupling circuit itself is relatively insensitive to changes in capacity to ground. Thus the leads 61 and 62 may be made as long as desired without requiring any special precautions to be taken against the effects of variations in such capacity. It is quite feasible to enclose the direct current leads 21 and 22 and the leads 61 and 62 in a single cable, as shown in Figure 7, which may be the sole connection between the portions of the mechanism positioned adjacent to the material to be measured and remote therefrom. It is quite desirable, although not essential, that these leads be formed into a cable having a strong and tough casing such as 65 in Figure 7, the leads being free to move relatively therein so that this cable may have considerable flexibility. With this arrangement it is quite possible to have the indicator 20 and the high frequency circuit containing the oscillating tube positioned in the office of the superintendent or other official while the measuring device 1 is arranged in the shop or factory where the material being measured is being operated upon. By this means the measuring may be indicated remote from the operative so that he will have no incentive to tamper with the mechanism in an effort to make its readings advantageous to him, and the superintendent or other official is able to keep an accurate check on the quality and uniformity of the goods which are being tested. It is also possible and convenient to move the measuring unit about as desired relative to the oscillator without detriment since the connections between the two are insensitive to position variations and are contained in a single flexible cable.

In order to further improve the mechanism the oscillator circuit and the parts associated therewith remote from the measuring device may be built up in unitary parts and assembled in a single casing. This not only facilitates the wiring, but makes it an easy matter to interchange or replace individual units without disturbing the remainder of the mechanism. It also makes possible the positioning in a more sheltered location of the entire exciting circuit with its vacuum tube and its associated parts as well as of the indicating instrument, which might be subject to damage or disarrangement through careless handling or vibration or other condition, than is possible for the measuring condenser which itself must often be intimately associated with machinery where vibration, careless handling, or other conditions detrimental to the more delicate parts of the mechanism are as a practical matter unavoidable. Such a construction is shown in Figures 1, 2 and 4 to 6. To this end a grounded metal shielding casing containing this portion of the mechanism may comprise a box portion 100 divided by a vertical partition 101 and horizontal partitions 102 and 103 into a plurality of compartments, these being shown. The compartment 106 above the horizontal partitions 102 and 103 may be used to house the indicating instrument 20, which as shown may be secured therein by brackets 106 and 107 formed to receive fastening elements 108 on the ends of the instrument. The space beneath the base of this instrument and the upper face of the partition 102 may receive the wiring leading to this instrument and which may be extended through an opening 109 in the upper end of the vertical partition 101 to a panel board 110 in the compartment 111 beneath the partition 103. This compartment 111 may house the tube unit comprising the tube socket 112 and the radio frequency choke 50 which are mounted on a common base 113 (see Figure 6). The space beneath the horizontal partition 102 may be used to house other elements of the exciting circuit such as the coils 47 and 38 which are wound on the tube 610 and the coil 60 turnable on the shaft 115 provided with a control knob 116 on the forward face of a vertical panel 117, and the condensers 37, 40 and 46. The thermostat condenser 39 may be mounted on the front face of the panel 117. The panel 117 may be formed integral with a base member 118 and a rear upstanding wall member 119 which supports the grid resistor 45. The radio frequency ammeter 41 may be mounted in the outer wall of the casing beneath the partition 102 so that its dial will be visible through an opening 120 therein. The forward face of the casing may be closed by a cover member 125 having a window slot 126 therethrough through which the indications of the instrument 20 may be viewed. Similarly the excited current parts comprising the condensers 9 and 10, the coils 63 and 5 and the thermocouple 11 may be housed in a metallic casing adjacent to the device 1 and which is diagrammatically indicated at 130 in Figure 3.

This application is a continuation in part of my application Serial No. 608,325 filed April 29, 1932, for Measuring mechanism.

From the foregoing description of an embodiment of this invention it should be evident to those skilled in the art that various changes and modifications might be made without departing from the spirit or scope of this invention as defined by the appended claims.

I claim:

1. A mechanism of the class described comprising a pair of high frequency oscillatory circuits, one of said circuits including an oscillator, and an aperiodic circuit included in a single cable loosely coupled to both of said oscillatory circuits and through which the other of said oscillatory circuits may be excited from said one circuit.

2. A mechanism of the class described comprising a pair of high frequency oscillatory circuits, one of said circuits including an oscillator, and a low voltage aperiodic circuit included in a single cable loosely coupled to both of said oscillatory circuits and through which the other of said oscillatory circuits may be excited from said one circuit.

3. A mechanism of the class described comprising a pair of high frequency oscillatory circuits, one of said circuits including an oscillator, an aperiodic circuit loosely coupled to both of said oscillatory circuits and through which the other of said oscillatory circuits may be excited from said one circuit, said excited circuit including a thermo-couple, a thermo-ammeter deriving current from said couple and connected thereto by lead wires, and a single cable including said lead wires and wires of said coupling circuit.

4. A mechanism of the class described, comprising a pair of high frequency circuits, one of said circuits including an oscillator and the other having a variable natural frequency, and an aperiodic circuit so loosely coupled to both of said oscillatory circuits that while the other of the oscillatory circuits may be excited therethrough from said one circuit both are effected to a negligible extent by a change of characteristics of said coupling circuit.

5. A mechanism of the class described, comprising a pair of high frequency oscillatory circuits, one of said circuits including an oscillator, the other of said circuits being of variable natural period and spaced a substantial distance from said oscillator, and an aperiodic coupling circuit so loosely coupled to both of said oscillatory circuits and having lead wires traversing said distance that changes of characteristics of said coupling circuit have negligible effect on either of said oscillatory circuits.

6. A mechanism of the class described, comprising a pair of high frequency oscillatory circuits, one of said circuits including an oscillator, the other of said circuits being of variable natural period and spaced a substantial distance from said oscillator, and a low voltage aperiodic coupling circuit so loosely coupled to both of said oscillatory circuits and having lead wires traversing said distance that changes of characteristics of said coupling circuit have negligible effect on either of said oscillatory circuits.

7. A mechanism of the class described comprising a pair of high frequency oscillatory circuits, one of said circuits including an oscillator, means for coupling the other of said circuits to said oscillator circuit for excitation thereby, one of said circuits including a tuning element responsive in its tuning value to a characteristic of material to be measured, said mechanism comprising a portion including said tuning element positioned adjacent to the material to be measured, a portion including said oscillator remote from said material, and connections insensitive in relation to both circuits to changes of capacity to ground between said portions.

8. A mechanism of the class described comprising a pair of high frequency oscillatory circuits, one of said circuits including an oscillator, means for coupling the other of said circuits thereto for excitation thereby, one of said circuits including a tuning element responsive in its tuning value to a characteristic of material to be measured, said excited circuit including an indicator responsive to current flow in said excited circuit, said mechanism comprising a portion including said tuning element positioned adjacent to said material to be measured, a portion including said oscillator and said indicator remote from said material, and connections insensitive with respect to indications on said indicator to capacity changes to ground of said portions.

9. A mechanism of the class described comprising a pair of high frequency oscillatory circuits, one of said circuits including an oscillator, means for coupling the other of said circuits thereto for excitation thereby, one of said circuits including a tuning element responsive in its tuning value to a characteristic of material to be measured, said excited circuit including current measuring means comprising a thermo-couple heated by the high frequency current in said excited circuit, and a direct current indicator receiving direct current from said thermo-couple, said mechanism comprising a portion including said tuning element and said thermo-couple positioned adjacent to said material to be measured, a portion including said oscillator and said indicator remote from said material, and connections between said portions including direct current leads between said thermo-couple and indicator and alternating current leads insensitive with respect to indications on said indicator to capacity changes to ground of both portions.

10. A mechanism of the class described comprising a pair of high frequency oscillatory circuits, one of said circuits including an oscillator, means for coupling the other of said circuits to said oscillator circuit for excitation thereby, said excited circuit including a tuning element responsive in its tuning value to a characteristic of material to be measured, said mechanism comprising a portion including said tuning element positioned adjacent to the material to be measured, a portion including said oscillator remote from said material, and connections including a low voltage coupling circuit loosely coupled at both ends between said oscillator and excited circuits extending between said portions.

11. A mechanism of the class described comprising a pair of high frequency oscillatory circuits, one of said circuits including an oscillator, means for coupling the other of said circuits thereto for excitation thereby, said excited circuit including a tuning element responsive in its tuning value to a characteristic of material to be measured, said excited circuit including current measuring means comprising a thermo-couple heated by the high frequency current in said excited circuit, and a direct current indicator receiving direct current from said thermo-couple, said mechanism comprising a portion including said tuning element and said thermo-couple positioned adjacent to said material to be measured, a portion including said oscillator and said indicator remote from said material, and connections between said portions including direct current leads between said thermo-couple and indicator and a low voltage coupling circuit between and loosely coupled to both said oscillator and excited circuits.

12. A mechanism of the class described comprising a pair of coupled high frequency oscillatory circuits, one of said circuits including a vacuum tube and control devices causing oscillation of said tube, the other of said circuits including a tuning element in responsive relation to a characteristic of material to be measured and means including an indicator for measuring the current induced by said tube circuit therein, said mechanism comprising a portion remote from said material and containing said tube circuit and said indicator, a portion comprising said tuning element, and cable connections between said portions, one of said portions comprising a casing having a plurality of compartments therein, and unitary assemblies of circuit parts in each of said compartments.

13. A mechanism of the class described comprising a pair of coupled high frequency oscillatory circuits, one of said circuits including a vacuum tube and control devices causing oscillation of said tube, the other of said circuits including a tuning element in responsive relation to a characteristic of material to be measured and means including an indicator for measuring the current induced by said tube circuit therein, said mechanism comprising a portion remote from said material and containing said tube circuit and said indicator, a portion comprising said tuning element, and connections between said portions, said first mentioned portion comprising a casing having a plurality of compartments therein, said tube and its mounting being housed in one of said compartments, said indicator being mounted in another of said compartments, and certain of said control devices being housed in another of said compartments.

14. A mechanism of the class described comprising a pair of coupled high frequency oscillatory circuits, one of said circuits including a vacuum tube and control devices causing oscillation of said tube, the other of said circuits including a tuning element in responsive relation to a characteristic of material to be measured and means including an indicator for measuring the current induced by said tube circuit therein, said mechanism comprising a portion remote from said material and containing said tube circuit and said indicator, a portion comprising said tuning element, and connections between said portions, one of said portions comprising a grounded metallic casing having a plurality of compartments therein, and unitary assemblies of circuit parts in each of said compartments.

15. A mechanism of the class described comprising a pair of coupled high frequency oscillatory circuits, one of said circuits including a vacuum tube and control devices causing oscillation of said tube, the other of said circuits including a tuning element in responsive relation to a characteristic of material to be measured and means including an indicator for measuring the current induced by said tube circuit therein, said mechanism comprising a portion remote from said material and containing said tube circuit and said indicator, a portion comprising said tuning element, and connections between said portions, said first mentioned portion comprising a grounded metallic casing having a plurality of compartments therein, said tube and its mounting being housed in one of said compartments, said indicator being mounted in another of said compartments, and certain of said control devices being housed in another of said compartments.

16. A mechanism of the class described, comprising a pair of high frequency oscillatory circuits, one of said circuits including an oscillator, the other of said circuits being movable relative to said oscillator, and a low voltage aperiodic coupling circuit loosely coupled to both of said oscillatory circuits and having lead wires enclosed in a single cable extending therebetween.

17. A mechanism of the class described, comprising a pair of high frequency oscillatory circuits, one of said circuits including an oscillator, means for coupling the other of said circuits to said oscillator circuit for excitation thereby, one of said circuits including a tuning element responsive in its tuning value to a characteristic of material to be measured, said mechanism comprising a portion including said oscillator, and a portion movable with relation to said first mentioned portion and including said tuning element, and connections insensitive to changes of capacity to ground between and loosely coupled at opposite ends to said portions.

18. A mechanism of the class described, comprising a pair of high frequency oscillatory circuits, one of said circuits including an oscillator, means for coupling the other of said circuits to said oscillator circuit for excitation thereby, one of said circuits including a tuning element responsive in its tuning value to a characteristic of material to be measured, said mechanism comprising a portion including said oscillator, and a portion movable with relation to said first mentioned portion and including said tuning element, and connections insensitive to changes of capacity to ground between and loosely coupled at opposite ends to said portions and contained in a single flexible cable.

WILFRED H. HOWE.